June 22, 1954 — R. T. CLOUD — 2,681,568
MARITIME MAPPING MEANS
Filed Nov. 18, 1946 — 3 Sheets-Sheet 1
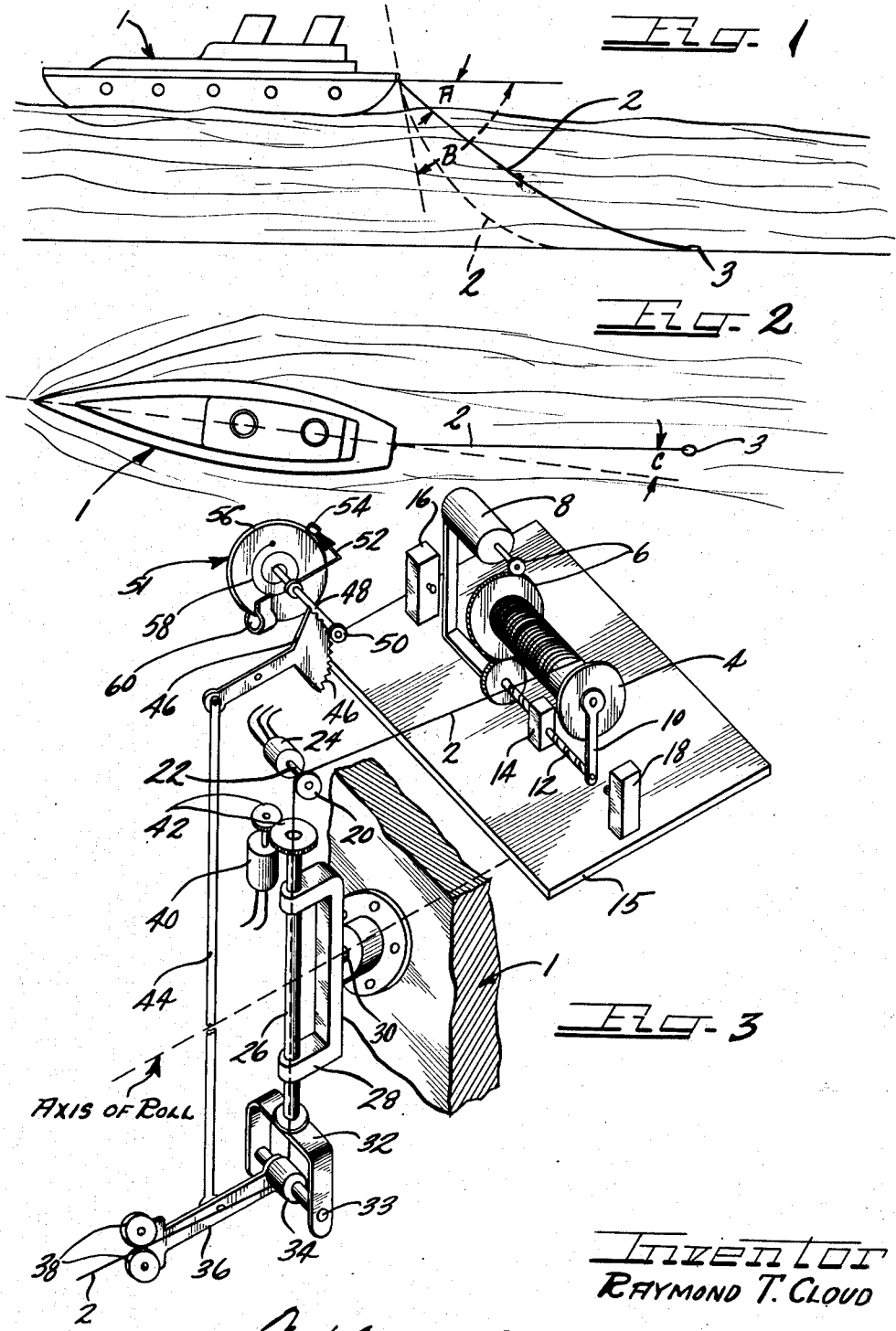
Inventor
RAYMOND T. CLOUD

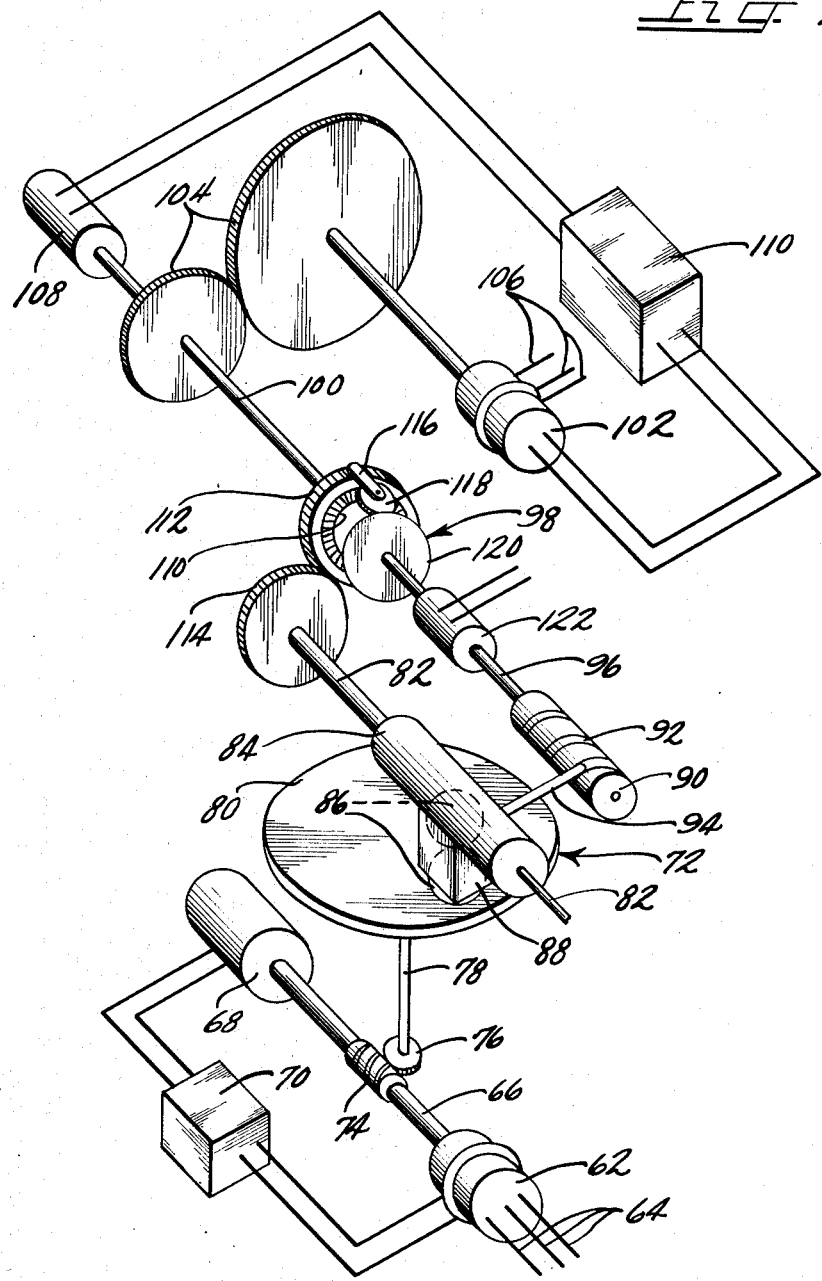

June 22, 1954
R. T. CLOUD
2,681,568
MARITIME MAPPING MEANS
Filed Nov. 18, 1946
3 Sheets-Sheet 3
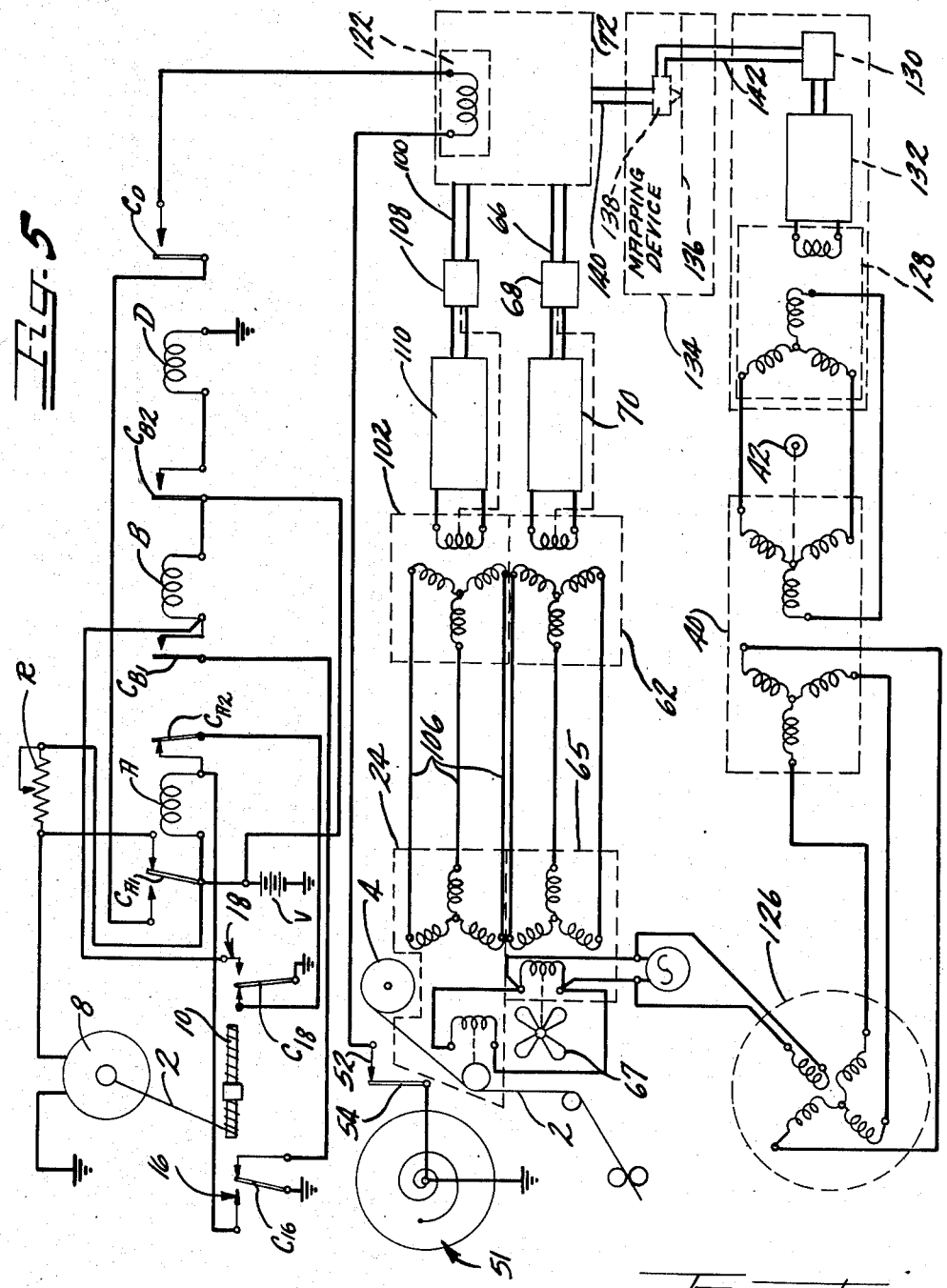
Inventor
RAYMOND T. CLOUD
by
Attys Patented June 22, 1954

2,681,568

UNITED STATES PATENT OFFICE 2,681,568

MARITIME MAPPING MEANS

Raymond T. Cloud, Houston, Tex., assignor to North American Geophysical Co., Houston, Tex., a corporation of Texas Application November 18, 1946, Serial No. 710,608

4 Claims. (Cl. 73—178)

This invention relates to an improved apparatus for mapping the course of a vessel travelling on water.

While many devices have heretofore been known and utilized for accurately determining the position of a vessel on water as expressed in terms of latitude and longitude, there has not been available a successful and practical device for accurately indicating the exact path traversed by the vessel in proceeding from one known position to another position sufficiently separated from the first position to permit a new bearing to be taken. While for ordinary navigational purposes, it is sufficient to indicate the path of the vessel by straight lines connecting the spaced points at which the vessel bearings are taken either by solar or radio instruments, such approximate methods of indicating the vessel path are not suitable for vessels conducting accurate surveys of the ocean, lake, or river bottoms.

Of recent years, there has been considerable activity in conducting seismic surveys of relatively shallow tide-land waters which characterize certain portions of the United States coast line, to determine the oil-bearing possibilities of the bottom. When such survey locates an area of the bottom which indicates the possibility of containing oil deposits, it is obviously most important that such area be accurately re-located so that subsequent vessels carrying drilling equipment or the like may be assured of arriving at the same location. This is a particularly difficult problem when the bottom area of interest lies out of sight of land or other fixed objects upon which a bearing might be taken. Obviously, solar bearings or bearings determined by radio would not yield sufficiently accurate results to insure that a subsequent vessel could exactly retrace the path of the exploring vessel.

There has therefore been a distinct need for a method and an apparatus for accurately plotting the course of a vessel traveling on water with respect to the bottom over which the vessel passes. The existence of arbitrary drifting movements of the vessel induced by water currents or wind obviously eliminates any solution achieved merely by continuously measuring the speed of the vessel with respect to the water and continuously determining the steering of the vessel with respect to the earth's magnetic axis.

In accordance with this invention, the actual path traveled by a vessel on water is plotted on a suitable mapping surface as a function of the path of the vessel with respect to the bottom of the water body over which it passes. The bearing of the vessel is continuously indicated by conventional magnetic compass devices so that at all times an indication is provided of the angular deviation of the longitudinal axis of the vessel with respect to the earth's magnetic axis. However, such deviation represents the true course of the vessel with respect to the bottom only under the unusual conditions of zero current and wind acting on the vessel. Hence, to determine the continuous angular deviation of the actual path of the vessel with respect to the earth's magnetic axis, this invention contemplates the paying out of a cable from the vessel and submerging the free end of such cable so that it contacts the bottom. Such cable will then lie in a substantially vertical plane as it is towed by the vessel and the angle between such vertical plane and the vertical plane passing through the longitudinal axis of the vessel may be continuously indicated by a suitable apparatus. In accordance with this invention such second indication is combined with the first mentioned indication to produce a continuous indication of the angular deviation of the velocity vector of the vessel's path with respect to the earth's magnetic axis.

To determine the distance traveled by the vessel, this invention provides apparatus for continuously indicating the speed of the vessel with respect to the water. This first indication is then continuously modified to compensate for the effects of drift of the vessel, whether produced by current or wind. Periodically, the cable towed by the vessel is payed out from the vessel at a rate such that the end of the cable remains stationary with respect to the bottom, hence, at a rate equal to the speed of the vessel with respect to the bottom. Thus a periodic indication of the actual speed of the vessel with respect to the bottom is obtained and such periodic indication is compared with the aforementioned continuous indication to effect any necessary correction to the drift compensating action to bring the continuous indication of the theoretical speed of the vessel with respect to the bottom into conformity with the actual speed of the vessel with respect to the bottom during each measuring period. Such indication of the speed of the vessel with respect to the bottom is supplied concurrently with the directional indication to any suitable mapping device and hence the actual path traveled by the vessel may be plotted on a mapping surface.

Accordingly, it is an object of this invention to provide an improved apparatus for accurately mapping the path of a vessel traveling on water.

A further object of this invention is to provide an improved apparatus for obtaining a continuous indication of the velocity of a vessel traveling on water with respect to the bottom surface.

A further object of this invention is to provide an improved apparatus for continuously indicating the angular deviation of the velocity vector of a vessel traveling on water with respect to the earth's magnetic axis or any other fixed coordinate system.

A particular object of this invention is to provide an improved apparatus for continuously indicating the speed of a vessel traveling on water with respect to the bottom by utilizing periodic measurements of the actual speed of the vessel with respect to the bottom.

Another object of this invention is to provide an improved apparatus for determining the actual speed of a vessel traveling on water with respect to the bottom as well as the angular deviation of the longitudinal axis of the vessel from the path traveled by the vessel by the utilization of a cable towed by such vessel, and, in particular, to provide an improved cable support for supporting the cable on the vessel for pivotal movement about the axis of roll of the vessel to thereby eliminate the effect of the roll of the vessel upon the measurements effected by the cable.

The specific nature of the invention as well as other objects and advantages thereof will become apparent to those skilled in the art from the following detailed description of the annexed sheets of drawings which, by way of preferred example only, illustrate one specific embodiment of the invention.

On the drawings:

Figure 1 is a schematic, vertical elevational view showing the relationship of a vessel whose course is to be plotted and the cable towed by such vessel.

Figure 2 is a plan view of Figure 1 and illustrating in particular the angular deviation of the longitudinal axis of the vessel with respect to the cable towed by the vessel.

Figure 3 is a schematic perspective view of an apparatus for supporting and paying out the measuring cable from a vessel.

Figure 4 is a schematic perspective view of the drift compensating mechanism embodied in this invention.

Figure 5 is a schematic circuit diagram of a complete mapping apparatus embodying this invention.

As shown on the drawings:

Referring to Figure 1, it will be recognized by those skilled in the art that the actual path of a vessel traveling on water will be substantially identical to the path traced on the bottom by a cable or other form of drag line 2 which has one end in contact with the bottom and the other end carried by the vessel. Furthermore, when the vessel supported end of cable 2 is not permitted to move relative to the vessel 1, and a suitable streamlined weight 3 is attached to the free end of the cable, the weight 3 will be dragged along the bottom at the same rate as the vessel is proceeding with respect to such bottom and the weight 3 will exert a certain amount of drag on the cable 2 tending to pull such cable off the vessel. Hence, the cable 2 will assume a catenary configuration and a certain angle A will be defined between the vessel supported end of the cable and a horizontal plane.

If the drag of the weight 3 is permitted to pull the cable off a reel on the vessel so that the weight 3 on the free end of the cable will remain stationary with respect to the bottom, then the rate of pay-out movement of the cable with respect to the vessel will be identically equal to the rate of movement of the vessel with respect to the bottom. Under such conditions, the cable will assume a different catenary form such as indicated in dotted lines in Figure 1 and the new catenary shape of cable 2 will produce a substantial increase in the angle which the vessel supported end of the cable makes with the horizontal. Such angle is indicated in Figure 1 as the angle B.

Now referring to Figure 2, it is apparent that the cable 2, whether dragged by the boat or payed out therefrom so as to maintain the weight 3 in a fixed position on the bottom, will lie in a substantially vertical plane and the angular deviation between the vertical plane defined by the cable and a vertical plane passing through the longitudinal axis of the vessel will provide an angle C which will continuously be equivalent to the angular deviation of the velocity vector of the actual path of the vessel with respect to the longitudinal axis of the vessel.

The aforedescribed properties of a cable towed by a vessel are utilized in a mapping device embodying this invention. In Figure 3 I have shown a schematic arrangement for supporting the cable 2 on the vessel. The vessel supported end of cable 2 is wound upon a reel 4 which is driven through suitable gears 6 by an electric motor 8. As will be described in more detail later, suitable electrical connections are provided to periodically energize motor 8 to drive the reel 4 in a direction to wind the cable 2 thereupon. Both the motor 8 and reel 4 are mounted upon a frame 10 which includes a screw portion 12 cooperating with a fixed nut member 14 to provide an axial movement of the reel 4 concurrently with its winding movement so that the cable 2 is wound upon the reel 4 in a single layer. Nut member 14 is supported on a suitable base 15 carried on the vessel 1. At either extreme of axial movement of the frame 10, frame 10 engages limit switches 16 and 18 respectively, which, as will be later described, are incorporated in the electrical energizing circuit of motor 8 to produce the periodic energization thereof.

From the reel 4, the cable 2 passes over a pulley 20 which is secured to the shaft 22 of a Selsyn-type generator 24. Hence, generator 24 will be rotated at a speed proportional to the speed of the cable with respect to the vessel and will generate a voltage having characteristics proportional to its speed of rotation.

Cable 2 then passes through a hollow elongated cable guide member 26, which is pivotally mounted in the spaced arms of a yoke 28. The stem portion 30 of yoke 28 is in turn pivotally mounted on the vessel, preferably in coincidence with the axis of roll of the vessel, hence the axis of pivotal movement of guide member 26 is always substantially perpendicular to the axis of roll of the vessel.

At its bottom end, guide member 26 supports a U-shaped bracket 32 between the arms of which is journaled a shaft 33 carrying an idler pulley 34 and a cable support arm 36. Cable 2 is trained around idler pulley 34 and is effectively secured to the pivoted cable support arm 36 by passing between the closely adjacent peripheries of a pair of pulleys 38 mounted on the end of support arm 36.

It is thus apparent that the cable 2 may be freely reeled upon the reel 4 or payed out therefrom without interference from any of the cable supporting apparatus. Any angular deviation of the longitudinal axis of the vessel with respect to the velocity vector of the actual path traveled by the vessel will produce a pivoting of the cable guide member 26 with respect to the yoke 28. Such pivotal movement is transmitted to a rotary differential transformer 40 by cooperating gears 42.

By virtue of the pivotal mounting of yoke 28 in coincidence with the axis of roll of the vessel 1, the yoke 28 will maintain the cable guide member 26 in a substantially vertical position due to the drag of the cable 2 and such vertical positioning of the cable guide member 26 will be unaffected by the rolling movement of the vessel 1.

As was heretofore pointed out, the angle which the cable 2 makes with a horizontal plane at the point of its support on the vessel 1 will vary according to whether the cable 2 is dragging the weight 3 along the bottom or is being payed out so as to maintain the weight 3 in a stationary position on the bottom. Such change in the catenary angle of the vessel supported end of cable 2 is accurately reproduced by the pivotal movement of the support arm 36 with respect to the shaft 33. The pivotal movement of cable support arm 36 is transmitted by link 44 to operate a segmental gear 46 which in turn drives a shaft 48 through pinion 50. The shaft 48 operates a time delay switch 51, the essential elements of which constitute a contact 52 secured to and movable with shaft 48 and a contact 54 secured to and movable with a disk 56 which is freely rotatable on shaft 48. The disk 56 is flexibly coupled to shaft 48 by a torsion spring 58 so that when shaft 48 assumes any given position and maintains such position for a sensible period of time, the disk 56 under the bias of spring 58 rotates to follow the movement of shaft 48 to effect engagement of contact 54 with contact 52. To further delay the movement of disk 56, any suitable damping means may be provided such as an eddy current magnetic brake indicated schematically at 60.

As was heretofore stated, if the cable 2 can be payed out from the vessel 1 at exactly the rate required to maintain the weight 3 stationary with respect to the bottom and to maintain a certain tension in the cable 2, then the rate of pay-out of cable 2 with respect to the vessel will be exactly equal to the velocity of the vessel with respect to the bottom. Such condition is conveniently obtained in accordance with this invention by electrical connections which effect a suitable connection of a braking resistor R (Figure 5) in circuit relation with the motor 8 so that the energization of the motor is reduced below a value sufficient to overcome the drag on cable 2 produced by the weight 3. Hence, the weight 3 will remain stationary on the bottom and the cable 2 will pay off reel 4 opposed by a predetermined tension exerted by motor 8 and at a rate exactly equal to the speed of vessel 1 with respect to the bottom. By proportioning the reel 4 so that the cable 2 is always wrapped thereon in only a single layer, I have eliminated any variation in cable pay-out speed due to varying diameter of the cable 2 on the reel 4. It is therefore apparent, that under the aforedescribed conditions, the Selsyn generator 24 will generate a voltage having characteristics which are exactly proportional to the speed of the vessel with respect to the bottom. However, such indication of the actual speed of the vessel with respect to the bottom is obtained only periodically as the cable 2 necessarily must be re-reeled onto the reel 4.

The accurate operation of any conventional form of mapping device requires a continuous indication of the velocity of the mapping vehicle with respect to a fixed surface, in this case, the velocity of the vessel with respect to the bottom. In Figure 4 I have schematically indicated suitable apparatus for obtaining an accurate continuous indication of the speed of the vessel 1 with respect to the bottom. A Selsyn motor 62 is supplied by leads 64 from a suitable Selsyn generator 65 (Figure 5) which is driven by any one of several well known forms of taffrail logging devices. The structure of such logging device 67 is entirely independent of this invention and it will be sufficient to point out that the voltage transmitted to Selsyn motor 62 by conductors 64 will be exactly proportional to the speed of the vessel 1 with respect to the water. Selsyn motor 62 is connected to a shaft 66 which is also driven by a servo-motor 68. The usual control amplifier 70 is connected between Selsyn motor 62 and servo-motor 68. Obviously, if Selsyn motor 62 is of sufficient power, it may be utilized to drive shaft 66 without the aid of servo-motor 68. In any event, shaft 66 is driven at a rate which is exactly proportional to the velocity of the vessel with respect to the water.

The velocity of shaft 66 is fed into a drift compensating mechanism indicated generally by the numeral 72. Specifically, a worm gear 74 drives worm wheel 76 which is secured to a shaft 78 which drives a horizontal table 80. The speed of rotation of table 80 is therefore a function of the velocity of vessel 1 with respect to the water.

It will be recognized by those skilled in the art that the movement of the vessel with respect to the bottom produced by current or wind, in other words the drift movement of the vessel, will be substantially constant over short intervals of time. Hence, if appropriate compensation of the speed of rotary table 80 is effected to produce rotation of another member at a compensated velocity, then such compensated velocity can be made to represent the theoretical velocity of the vessel with respect to the bottom, provided that the compensation effected is periodically adjusted to make the theoretical velocity equal to the actual velocity during the period of adjustment.

Accordingly, a horizontal shaft 82 is arranged to be rotated by table 80 at a velocity representing the velocity of the vessel with respect to the water plus appropriate compensation for the effects of drift, or in other words, at a velocity which theoretically represents the speed of the vessel with respect to the bottom. The shaft 82 supports an elongated roller 84 which is driven from table 80 through a pair of balls 86 mounted in an adjustably positioned cage 88. The position of cage 88 thus effects adjustment of the power transfer relationship between table 80 and shaft 82, such adjustment being most conveniently effected by variation of the radial position of the ball carrying cage 88 with respect to the table 80. Thus when cage 88 positions the balls 86 at exactly the center of table 80 then no rotation is imparted to the shaft 82, irrespective of the speed of rotation of the table 80. This condition would exist when the drift of the vessel was exactly equal and opposite to the speed of the vessel with respect to the water. At a median radial position of the cage 88 with respect to the table 80, the shaft 82 will be driven at the same speed as the table 80 and this represents a condition of zero drift of the vessel. The positioning of the cage 88 still further out on the table 80 will produce a rotation of the shaft 82 at a speed greater than that of table 80 and represents the condition when the drift of the vessel has a component in aiding relationship to the velocity of the vessel with respect to the water.

It is therefore apparent that a proper radial positioning of cage 88 will effect rotation of shaft 82 at a velocity which is proportional to the actual velocity of the vessel with respect to the water as modified by the drift velocity of the vessel. In accordance with this invention, the proper radial position of the cage 88 is periodically established by comparing the velocity of the shaft 82 with that of a member rotating at a velocity which is a function of the actual speed of the vessel with respect to the bottom and effecting adjustment of the radial position of the ball carrying cage 88 in response to any differences between such compared velocities to eliminate such differences.

The radial position of ball carrying cage 88 is controlled by a cylindrical cam 90 carrying a generally helical cam track 92 on its surface. A cam follower 94 is provided on ball carrying cage 88 and engages in cam track 92. Cylindrical cam 90 is rotated by a shaft 96 and it will be apparent that rotation of the shaft 96 in one direction or the other produces a movement of cage 88 radially outwardly or inwardly with respect to the table 80.

Rotation of shaft 96 is controlled by a differential unit 98 through an electric clutch 122 in response to differences between the velocity of shaft 82 and the velocity of a shaft 100 which is periodically rotated as a function of the actual speed of the vessel 1 with respect to the bottom by voltage impulses derived from the Selsyn generator 24, which was heretofore described as being responsive to the speed of pay-out of the cable 2. A conventional servo-motor system is utilized for effecting the rotation of shaft 100 as a function of the voltage generated by Selsyn generator 24. A Selsyn motor 102 is provided having a geared connection 104 with shaft 100 and having input leads 106 connected to be energized by Selsyn generator 24. A servo-motor 108 is connected in driving relationship to shaft 100 and the customary electrical connections are made between Selsyn motor 108, an amplifier 110, and the Selsyn motor 102.

While the differential mechanism 98 may comprise any one of several well known forms, I preferably utilize the construction illustrated in Figure 4, wherein a first input gear 110 is keyed to shaft 100 while a second input gear 112 is freely rotatable about shaft 100 and has a gear connection 114 with the shaft 82. An axially extending arm 116 is provided on second input gear 112 and on the end of such arm a differential idler 118 is rotatably journaled. Idler 118 has teeth simultaneously meshing with input gear 110 and an output gear 120 secured to the shaft 96.

From the foregoing description, it will be apparent that when the velocities of shafts 82 and 100 are identical, then no rotation is imparted to the compensator control shaft 96. In this condition, the existing compensation being effected to the speed of table 80 is proper for the existing drift conditions to which the vessel 1 is subject. Any differences in speed of the shaft 82 and the shaft 100 produce, through differential mechanism 98 (assuming electric clutch 122 is energized to effect a driving connection), suitable rotation of the cylindrical cam 90 to radially shift the ball carrying cage 88 to make the speed of shaft 82 equivalent to that of shaft 100. This operation represents a condition wherein the effective drift of the boat has varied since the preceding period of operation of the actual velocity measuring apparatus which drives the shaft 100, and hence the theoretical velocity of the vessel with respect to the bottom, as represented by the velocity of the shaft 82, is then slightly different from the velocity of the shaft 100 representing the actual velocity of the vessel with respect to the bottom during the instant measuring period and so adjustment of the drift compensating mechanism to the new condition results.

Electric clutch 122 is controlled concurrently with the periodic operation of the actual velocity measuring apparatus so that the cylindrical cam 90 will be rotated by the differential mechanism 98, if required, only during those periods of paying out movement of the cable 2 when the actual velocity measuring apparatus is properly functioning.

Summarizing, the velocity of shaft 82 provides a continuous indication of the theoretical velocity of the vessel with respect to the bottom. Such theoretical continuous indication is derived by modification of a continuous indication of the velocity of the vessel with respect to the water. The accuracy of the indication of the theoretical velocity is periodically checked by comparison with the actual velocity of the vessel with respect to the bottom derived from the cable paying out mechanism. Any differences between the actual velocity of the vessel with respect to the bottom and the theoretical velocity, represented by the velocity of shaft 82, produces an adjustment of the modifying or drift compensating apparatus to eliminate such differences. Hence, at the end of each periodic measurement of the actual velocity of the vessel with respect to the bottom, the drift compensating mechanism is adjusted to represent the drift conditions that existed during such measuring period and such adjustment continues until the next subsequent measuring period where the adjustment is again corrected if necessary. Since the successive periods of paying out movement of the cable 2 can be made to occur at relatively short intervals of time, and since the drift of the vessel during such intervals of time is not appreciably changed, it is apparent that the method and apparatus described produces a continuous indication of the velocity of the vessel with respect to the bottom with an unusually high degree of accuracy.

Having a continuous indication of the actual speed of the vessel with respect to the bottom, as represented by the speed of rotation of the shaft 82, it will be recognized by those skilled in the art that the only other element required to operate any conventional mapping device is a continuous indication of the angular deviation of the velocity vector of the vessel's path with respect to some fixed coordinate system, such as the earth's magnetic axis.

The rotary differential transformer 40 heretofore described is mounted in such manner as to afford a continuous indication of the angular deviation of the velocity vector of the path of the vessel with respect to a vertical plane through the longitudinal axis of roll of the vessel 1. Having such indication, it is only necessary to combine this indication with a continuous indication of the angular deviation of the longitudinal axis of the vessel with respect to the selected system of fixed coordinates, such as the earth's magnetic axis. This latter indication may be conveniently obtained by any one of a plurality of well known compass arrangements.

I preferably utilize an earth inductor compass indicated schematically in Figure 5 by the numeral 126. For the present purposes, however, it is sufficient to say that the compass 126 is mounted on the vessel and continuously generates an alternating voltage which is a function of the angular deviation of the longitudinal axis of the vessel from the earth's magnetic axis. The output voltages of the inductor compass 126 are applied to one set of windings of the rotary transformer 40. The other set of windings of rotary transformer 40 are connected to energize a Selsyn motor 128 which in turn drives a servo-motor 130 through a conventional connection of an amplifier 132. The differential transformer 40 effects proper compensation of the output indication of the inductor compass 126 to compensate for the angle at which the longitudinal axis of the vessel 1 may be disposed with respect to the velocity vector of its path. Such angle corresponds to the angle C indicated in Figure 2. Hence, the output of servo-motor 130 is a continuous indication of the angular deviation of the velocity vector of the vessel's path with respect to fixed system of coordinates, such as the earth's magnetic axis.

The two indications thus provided by the apparatus heretofore described, namely the velocity of the vessel with respect to the bottom and the direction of the vessel velocity vector with respect to a fixed system of coordinates can then be applied to a mapping device 134 (Fig. 5). Mapping device 134 may comprise any one of several well known forms of such devices which in general include a mapping surface 136 and a marker 138. Suitable mechanism is provided for producing relative movement between mapping surface 136 and marker 138 as a function of the velocity and course of a moving object whose path is to be mapped. I preferably utilize a mapping device of the type described and claimed in my copending application Serial No. 714,876, filed December 7, 1946, now Patent 2,590,755, issued March 25, 1952. Suitable power transfer connections respectively schematically indicated at 140 and 142 are provided to operate the mapping device as a function of the speed of the shaft 82 and servomotor 130.

In Figure 5 I have illustrated a complete electrical wiring diagram of the apparatus heretofore described. The numerals applied to the structural elements of Figure 5 represent the elements heretofore described in detail. The periodic operation of the reel motor 8 is controlled by cycling relays A and B in cooperation with the limit switches 16 and 18. Figure 5 illustrates the position of the relays which exists during energization of reel motor 8 to reel the cable 2 in. The motor is then energized from a voltage source V by a circuit including the contact blade $C_{A1}$ of cycling relay A and the right hand contact of cycling relay A. In such position, the contact blade $C_{A1}$ shorts out a variable resistor R from the armature circuit of motor 8 and hence motor 8 is fully energized and will effect the reeling in of the cable 2. During this condition of operation, cycling relay B is deenergized by virtue of the contact blade $C_{18}$ of limit switch 18 being out of engagement with its right hand contact. Likewise, an electric clutch relay D is deenergized by virtue of the open circuit produced by contact blade $C_{B2}$. The energizing circuit for the electric clutch 122 is then opened by the contact blade $C_D$ as well as by the contact blade $C_{A1}$ being out of engagement with the left hand contact of cycling relay A.

Such conditions exist until a substantial portion of the cable 2 is wound upon the reel 4 so that the resulting axial movement of the reel frame 10 brings such frame into engagement with the limit switch 18. The blade $C_{18}$ of limit switch 18 is then transferred from its left hand contact to its right hand contact as viewed in Figure 5. This de-energizes relay A which in turn produces a movement of contact blade $C_{A1}$ from the right hand contact to the left hand contact and an opening of contact blade $C_{A2}$. The engagement of contact blade $C_{18}$ with the right hand contact closes an energizing circuit for cycling relay B which closes contact blade $C_{B1}$ to lock its energizing circuit through the series connected engagement of limit switch contact blade $C_{16}$ with its right hand contact. The de-energization of cycling relay A shifts contact blade $C_{A1}$ from its right hand to its left hand contact and hence inserts the resistor R in series circuit with the reel motor 8. The energization of the reel motor 8 is thus reduced so that the reel motor is no longer able to overcome the drag of the cable 2 and the cable 2 begins to pay out from the vessel under a predetermined tension exerted by reel motor 8 and hence the pay-out speed of the cable 2 is identical to the speed of the vessel 1 with respect to the bottom. The reel motor 8 thus acts as a brake with respect to the pay-out movement of cable 2. The energization of relay B also closes blade $C_{B2}$ against its contact to energize the electric clutch relay D. The contact blade $C_D$ completes the energization circuit for the clutch 122 provided that the contacts 52 and 54 of the delay switch 51 are in engagement. It will be remembered that these contacts close only when the catenary angle achieved by the vessel supported end of cable 2 maintains a substantial constant value for a sensible period of time, which indicates that the cable has achieved a pay-out speed equal to the speed of the vessel with respect to the bottom.

The paying out movement of cable 2 of course produces rotation of the Selsyn generator 24 and the usual connections are provided between the Selsyn generator 24, Selsyn motor 106, amplifier 110 and servo-motor 108. Servo-motor 108 drives shaft 100 which is applied to the drift compensating mechanism 72 indicated schematically in Figure 5 by a block diagram. It will be remembered that the electric clutch 122 determines the operation of the differential mechanism 98 to effect any required adjustment of the compensation produced by the drift compensating mechanism. Hence, it is apparent that the described circuit arrangement insures that any required modification of the drift compensating mechanism will occur only during the paying out periods of the cable and only during that portion of the paying out period when the cable has assumed a substantially constant catenary angle at its vessel-supported end.

At the beginning of the unreeling operation, the reel frame 10 moves out of engagement with limit switch 18 and hence limit switch blade C₁₈ returns to the position illustrated in Figure 5. As previously indicated, this does not affect the energization of cycling relay B for it is now locked through the contact blade C₁₆ of limit switch 16.

As the unreeling operation proceeds, the reel frame 10 moves toward limit switch 16 and eventually engages such switch and operates contact blade C₁₆ to its left hand position as shown in Figure 5 which re-energizes the cycling relay A and de-energizes cycling relay B. Hence, the resistor R is again shorted out of the armature circuit of the reel motor 8 and the reel motor 8 is sufficiently energized to overcome the drag of cable 2 and start the re-reeling operation. When the re-reeling starts, the reel frame 10 moves away from limit switch 16 and contact blade C₁₆ returns to the position in which it is shown in Figure 5. This, however, has no effect for relay A is then locked through contact blade C_{A2} and limit switch blade C₁₈ while cycling relay B remains de-energized through the opening of its locking circuit constituted by the blade C_{B1}.

It is therefore apparent that the reel motor 8 will be continuously periodically operated to wind up the cable 2 and then pay out such cable under a predetermined tension to achieve the vessel velocity measuring condition hereinbefore described.

Concurrently the taffrail log generator 67 is producing a voltage proportional to the speed of the vessel with respect to the water and conventional connections are provided between the taffrail log generator 67 and the servo-motor 68 including the selsyn motor 62 and amplifier 70. Servo-motor 68 drives the shaft 66 at a speed proportional to the speed of the vessel with respect to the water, as has heretofore been described.

The remaining portions of the circuit diagram of Figure 5 constitute the apparatus for continuously indicating the angular deviation of the velocity vector of the vessel's path with respect to a fixed system of coordinates and has heretofore been described.

It is therefore apparent that this invention provides a new and improved apparatus for accurately mapping the path of a vessel traveling on water with respect to a fixed system of coordinates. It will be recognized by those skilled in the art that the methods herein described may be carried out by a variety of apparatus other than that set forth herein as an illustrative example. Particularly, it will be recognized that the various indications of the factors necessary for mapping may be readily interchanged between electrical and mechanical variables, i. e., any final or intermediate indication may constitute either a voltage generated as a function of the particular variable or a mechanical movement whose rate of movement is a function of such variable.

It will, of course, be understood that the various details of construction may be varied throughout a wide range without departing from the principles of this invention and it is, therefore, not the purpose to limit the patent granted hereon otherwise than necessitated by the scope of the appended claims.

I claim as my invention:

1. In an apparatus for charting the path of a vessel traveling on a body of water with respect to the magnetic axis of the earth, vessel carried signal generating means generating a first signal component proportional to the angular deviation of a given axis defined with respect to the vessel relative the earth's magnetic axis, a cable depending from said vessel and having a free end carrying ground engaging means to contact the bottom of said body of water, pay-out means connected to the other end of said cable said pay-out means being adapted to pay-out the cable under constant tension at such a rate that the free end of the cable remains stationary with respect to bottom, said pay-out means being adapted to generate a signal responsive to the rate of pay-out proportional to the velocity of the vessel with respect to bottom and marking means responsive to said signals to chart a directional resultant of said signal components proportional to the deviation of the vessel's path from the earth's magnetic axis.

2. In an apparatus as defined in claim 1, an auxiliary signal generating means responsive to angular deviation of the cable to generate a signal proportional to said deviation relative to the said given axis, said marking means being responsive to the last said signal to chart said resultant in terms of the actual heading of the vessel and the ground speed of said vessel.

3. An apparatus for indicating the position, with respect to the ground, of a vehicle moving in a fluid itself movable with respect to the ground, which comprises, in combination, a map and an index movable with respect to each other, means for moving said index relatively to said map so as to reproduce the movement of the vehicle with respect to the ground when the movement of said fluid with respect to the ground is not taken into account, and means for continuously adding to this movement a movement of adjustable velocity and direction so as to take into account said movement of said fluid relative to the ground, comprising, ground-engaging cable means adapted to be carried on the vehicle, motorized reel means to periodically pay-out said cable means at selected speeds such that the free end of said cable is maintained substantially unmoving with respect to the ground, signal generating means driven by said cable means to generate signals proportionally responsive to the selected pay-out speed and deviation of the cable from the heading of the vehicle, and control means actuated by said signals and connected to the means for moving the index so as to move said index to correctively modify the movement of said index.

4. In combination, a mapping device for a vehicle movable in a fluid itself movable with respect to the ground and having a map and a marker relatively movable with respect to one another according to the heading of the vehicle, and control means to regulate the relative movement of said map and said marker to continuously reproduce the apparent movement of the vehicle with respect to the ground, a reel adapted to be carried on the vehicle, a ground engaging cable connected to said reel and adapted to be taken up thereon, a motor connected to said reel to selectively drive said reel at adjusted speeds so as to maintain a portion of the cable in substantially stationary engagement with the ground, a first signal generator engaging said cable and driven thereby to generate a signal proportionally responsive to the linear velocity of said cable, a pivoted yoke member guiding said cable member, a second signal generator actuated by said yoke member upon pivotal movement thereof to generate a second signal proportionally responsive to angular deviations of said cable with respect to the heading of the vehicle and actuating means for said control means responsive to said signals, thereby to correctively modify the relative movement of said map and said marker for plotting the true course of the vehicle with respect to the ground.

References Cited in the file of this patent

UNITED STATES PATENTS

| Number | Name | Date |
|---|---|---|
| 219,460 | Gordon | Sept. 8, 1879 |
| 919,707 | Eahrney | Apr. 27, 1909 |
| 1,310,200 | Maxim | July 15, 1919 |
| 1,310,201 | Maxim | July 15, 1919 |
| 1,891,502 | Sayre | Dec. 20, 1932 |
| 2,163,746 | Courtois-Suffit et al. | June 27, 1939 |
| 2,395,351 | Sohn | Feb. 19, 1946 |
| 2,569,328 | Omberg | Sept. 25, 1951 |

FOREIGN PATENTS

| Number | Country | Date |
|---|---|---|
| 2,105 (1911) | Great Britain | Jan. 29, 1912 |